Dec. 5, 1967       N. B. AGDUR ETAL       3,356,965
BEAM-PLASMA MICROWAVE NOISE GENERATORS
Filed March 12, 1965                    8 Sheets—Sheet 2
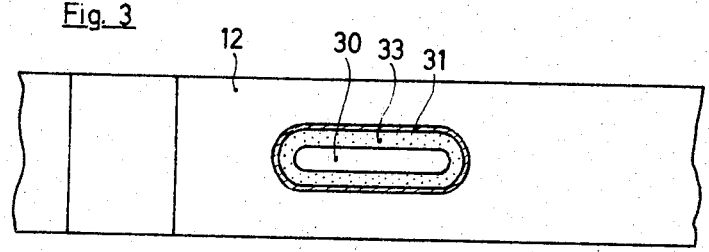
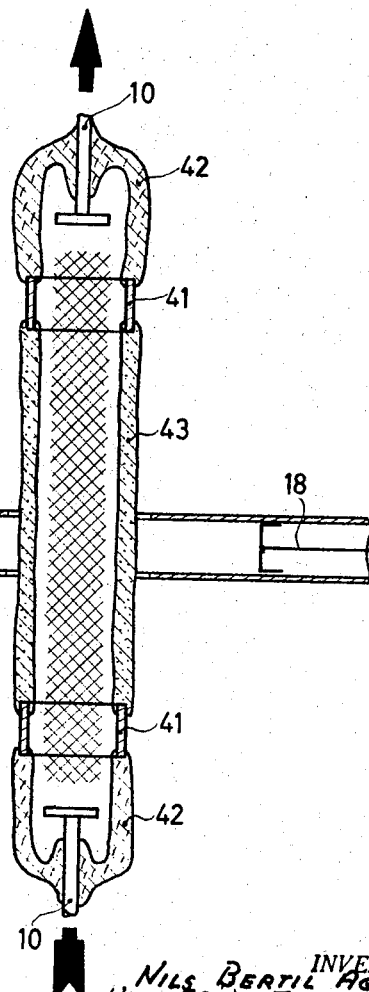
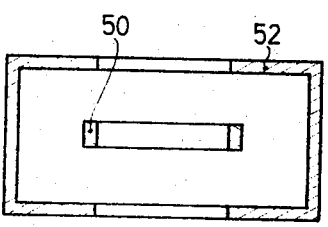

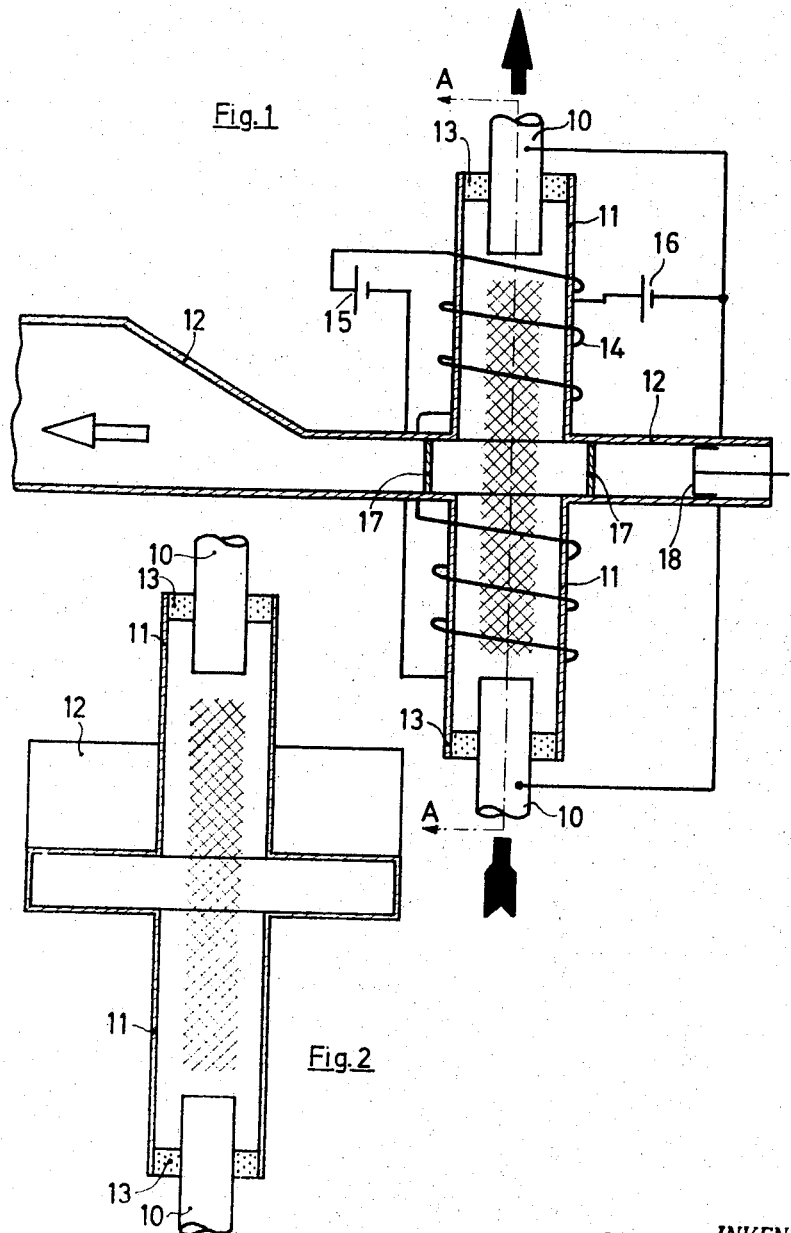

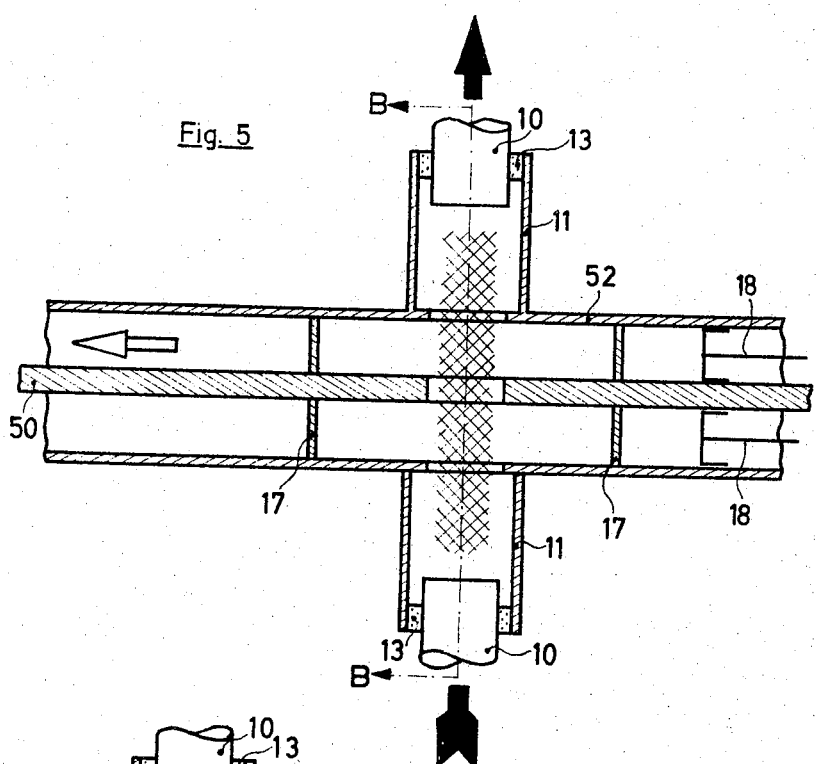

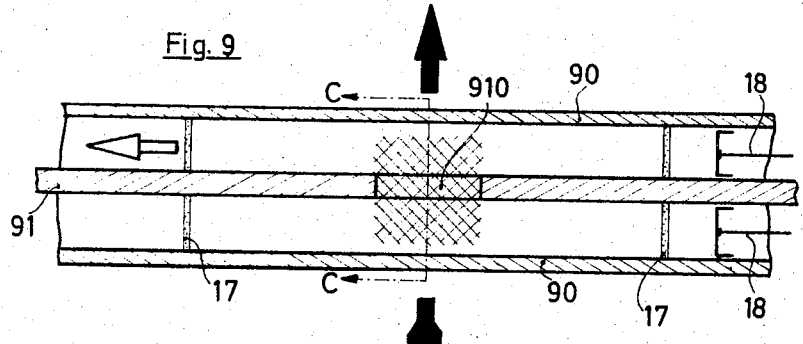
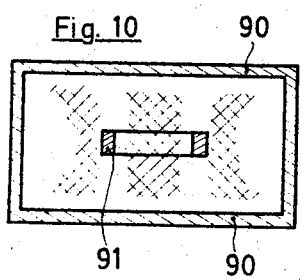
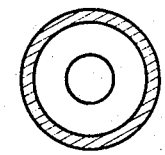
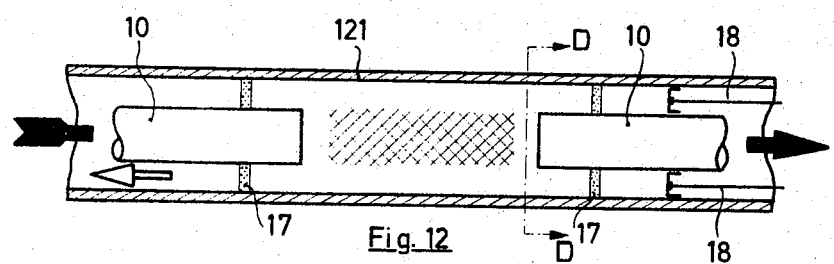
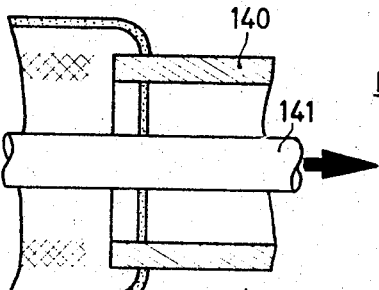
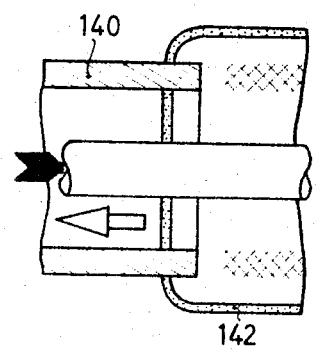

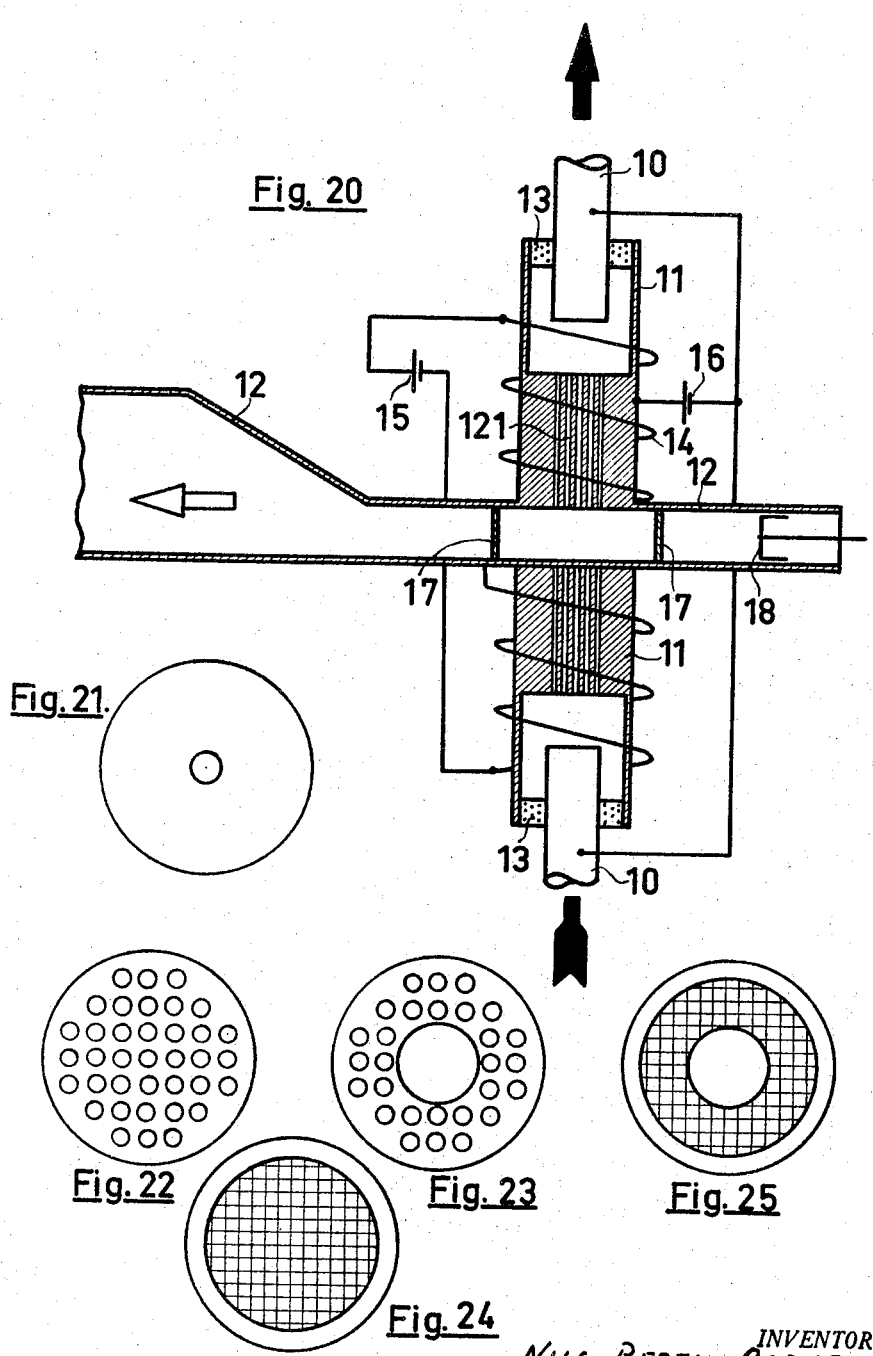

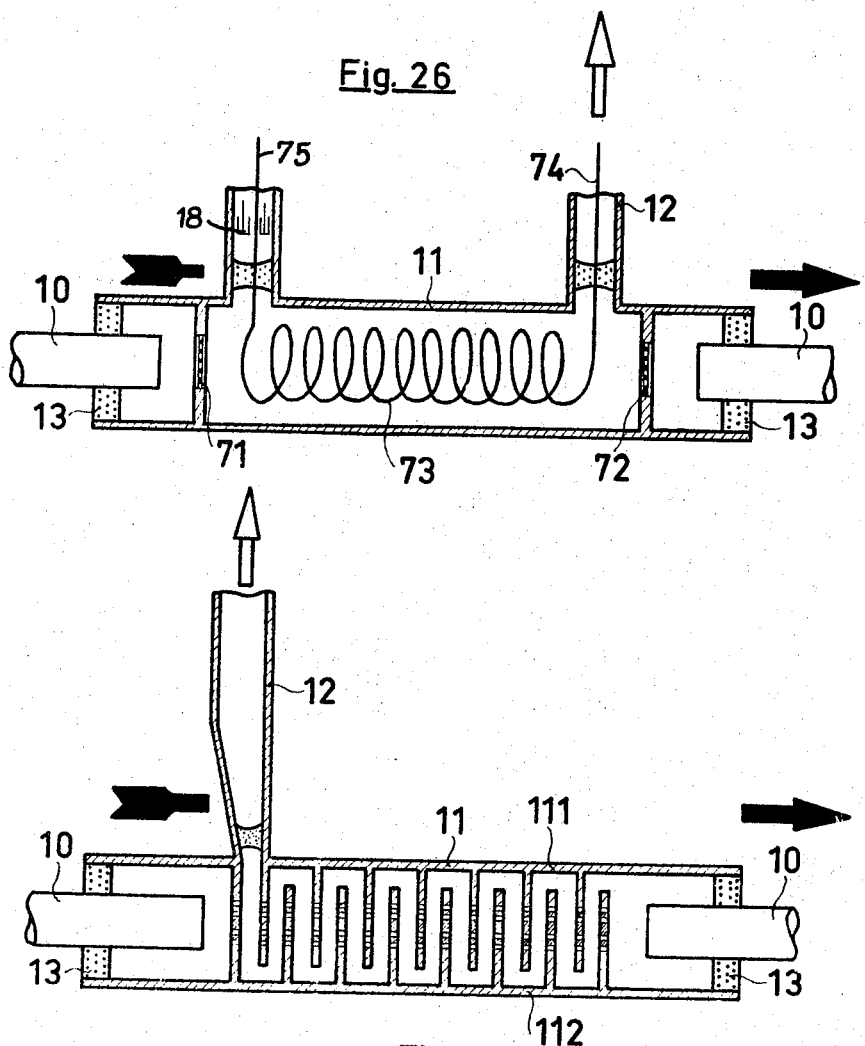

3,356,965
BEAM-PLASMA MICROWAVE NOISE
GENERATORS
Nils Bertil Agdur, Vilano vag 23, Danderyd, Sweden, and Ulf Erik Ternström, Kallangsvagen 85, Lidingo, Sweden
Filed Mar. 12, 1965, Ser. No. 439,159
Claims priority, application Sweden, Mar. 23, 1964, 3,587/64; Jan. 28, 1965, 1,110/65
18 Claims. (Cl. 331—78)

This invention relates to a gas discharge device of the kind that comprises a discharge tube with at least one cathode and one anode in the discharge chamber and a gas with an internal gas pressure of at least $10^{-4}$ mm. Hg and at most $10^{-2}$ mm. Hg; it also comprises a device for the generation of a static magnetic field in the discharge chamber, the direction of the magnetic field being such that electrons, which move in spiral paths along the field lines of the magnetic field, cannot leave the discharge chamber except through the influence of collisions and/or gain of energy from such dynamic electromagnetic fields as may spontaneously arise in the discharge chamber. Some of these electrons have velocities that are of the order of magnitude corresponding to the potential difference existing between cathode and anode, while other electrons have substantially lower velocities and, together with ions that are also present, form a plasma in the discharge chamber.

The purpose of the invention is to make available a discharge device that is suitable for use as a noise generator in the frequency range $10^2$ MHz–$10^5$ MHz.

A discharge device designed in accordance with the invention is characterized by the following: the strength of the static magnetic field and the electron density of the plasma are such that both the electron cyclotron frequency and the plasma frequency of the plasma are higher than the highest frequency of the noise generated in the discharge device; further, the device comprises an output circuit for the generated noise power, this circuit being positioned close to the plasma in such a way that the dynamic electromagnetic fields associated with the noise are transmitted to the said output circuit.

A more detailed description of the invention will be given with reference to the attached schematic drawings, of which FIG. 1 shows a device comprising two cathodes, one anode and an output circuit in the form of a waveguide.

FIG. 2 shows a section along A—A in FIG. 1.

FIG. 3 shows a modified version of the device shown in FIG. 1, seen from above.

FIG. 4 shows a device comprising two cathodes, two anodes and an output circuit in the form of a waveguide.

FIG. 5 shows a device comprising two cathodes, one anode and an output circuit in the form of a coaxial line with rectangular cross section.

FIG. 6 shows a section along B—B in FIG. 5.

FIG. 7 shows a component of the device shown in FIGS. 5–6, seen from above.

FIG. 8 shows a modified version of the component shown in FIG. 7.

FIG. 9 shows a device where the anode is the plane inner conductor of a rectangular coaxial line.

FIG. 10 shows a section along C—C in FIG. 9.

FIG. 11 (adjacent to FIG. 4) shows a modified output circuit for the device shown in FIG. 4.

FIG. 12 shows a device where the anode is the circular outer conductor of a coaxial line.

FIG. 13 shows a section along D—D in FIG. 12.

FIG. 14 shows a device where the anode is the inner conductor of a circular coaxial line.

FIG. 20 shows a device similar to that in FIG. 1 but with a special design of the discharge chamber.

FIG. 21 shows a disk with a central opening.

FIG. 22 shows a disk with a number of openings evenly distributed over the surface of the disk.

FIG. 23 shows an annular disk with a number of openings evenly distributed over its surface.

FIG. 24 shows a grid.

FIG. 25 shows an annular grid.

FIG. 26 shows a first modification of the device shown in FIG. 20, and finally,

FIG. 27 shows a second modification of the device shown in FIG. 20.

Figure 15:
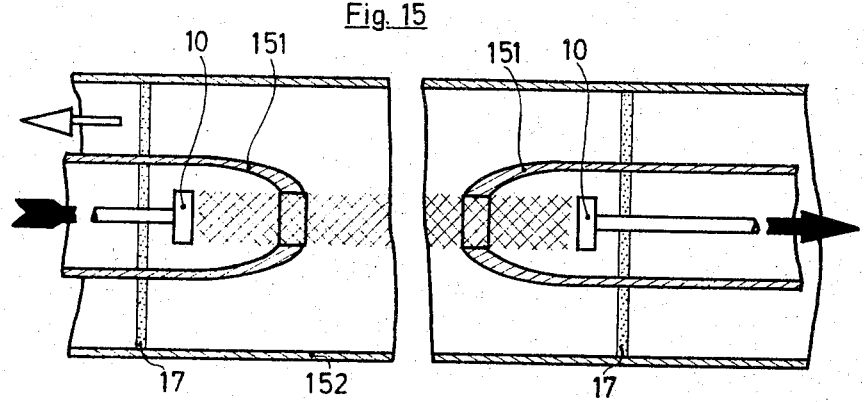
FIG. 15 shows a device comprising two cathodes and two anodes.

Before proceeding with the detailed description of the various embodiments of the invention, one common property of each embodiment will be stated so that it need not be repeated for each embodiment. Each embodiment includes a gas discharge chamber or tube. Within the discharge chamber is an ionizable gas such as argon, neon, hydrogen, nitrogen, etc. which can under the influence of electric fields create a plasma. The gas has a pressure of at least $10^{-4}$ mm. and at most $10^{-2}$ mm. of mercury.

The device shown in FIG. 1 comprises an anode having the form of a cylinder 11—11, two cathodes 10 placed symmetrically at the ends of the cylinder 11—11, and an output circuit 12 connected to the middle section of the cylinder 11—11 perpendicular to the cylinder axis, which axis is an axis of symmetry of the cathodes 10. Cathodes 10 which are cold cathodes are only electrically connected to the negative terminal of D.C. current source 16 whose positive terminal is connected to the cylinder 11—11 which acts as an anode. The ends of the cylinder have vacuum-tight seals in the form of annular disks 13 and the mid-section is sealed off from the output circuit 12, which consists of a waveguide, by means of plates 17 that are permeable for microwaves. In one end of the waveguide 12 there is a movable piston 18, which acts as a short-circuit and is used to influence the efficiency of the coupling to the output circuit. The other end of the waveguide constitutes the actual output circuit; the white (unfilled) arrow shows the direction of flow of the output energy.

On the cylinder 11—11 is mounted a magnet winding 14, which is connected to a D.C. current source 15. Inside the cylinder 11—11 the magnet winding generates a magnetic field whose direction is indicated by the large black (filled-in) arrow. This field might alternatively be provided by means of a permanent magnet. The cathodes 10 and the anode cylinder 11 are connected via a voltage source 16.

The working principle of the device shown in FIG. 1 is the following. Ion bombardment of the cathodes 10 causes, as is well-known, electrons to be released; the electrons will be accelerated because of the higher electric potential of the anode 11. The static magnetic field forces an electron to follow a path that spirals round a magnetic line of force, so that only after several oscillations between the cathodes 10 and after a number of collisions with neutral gas atoms will it be possible for the electron to reach the anode 11. Each electron will thus perform a relatively large number of ionizing collisions, so that fairly low currents will suffice to produce a discharge plasma of high density, i.e. with many electron-ion pairs. The approximate region where this plasma will be produced is indicated by the cross-hatching between the cathodes 10 in FIG. 1 and in subsequent figures.

This plasma, consisting of slow ions and electrons, gas atoms and fast electrons with velocities up to 10% of the velocity of light, is in general electromagnetically unstable, i.e. electromagnetic waves arising in the plasma can be amplified in such a way that the electrons give off energy to the electromagnetic waves, which have a phase velocity approximately equal to the velocity of the fast electrons.

Experiments have been made, demonstrating that noise will be generated and amplified in the device described if the following conditions are satisfied:

$$f_p/f_{noise} > 1 \text{ and } f_c/f_{noise} > 1$$

where $f_p$ is the plasma frequency of the plasma
$f_c$ is the electron cyclotron frequency and $f_{noise}$ is the highest frequency of the noise that is generated and amplified.

The frequencies $f_p$ and $f_c$ are given by the following expressions:

$$f_p^2 = \left(\frac{1}{2\pi}\right)^2 \frac{e^2 N}{m\epsilon_0} \qquad f_c = \frac{1}{2\pi} \frac{e}{m} B_0$$

where $e$ is the electron charge,
N is the number of electrons per unit volume,
$m$ is the electron mass,
$\epsilon_0$ is the dielectric constant of a vacuum and $B_0$ is the magnetic flux density.

The electromagnetic waves amplified in the device induce fields in the output circuit 12.

For example, a potential difference of some 700 volts between the anode 11 and the cathodes 10 and a magnetic flux density of about 0.15 Weber/m.² produced noise with frequencies up to approximately 4000 MHz.

The design of the output circuit (the waveguide) 12 is shown more clearly in FIG. 2, which shows a section along the center line A—A in FIG. 1.

The device shown in FIG. 1 can be modified in such a manner that the discharge region is extended in the direction along the waveguide 12. In this way, one can change the matching of the fields in the discharge region to the fields in the waveguide. In FIG. 3, such a modified device is shown from above. The discharge device has an oval cathode 30 and an anode cylinder 31, also with oval cross section. The vacuum-tight disk separating anode and cathode is marked 33. This device, like the one shown in FIG. 1, comprises two cathodes. As is evident from FIG. 3, the waveguide 12 is mounted so that its longitudinal direction coincides with the direction of the largest transverse dimension of the cylinder 31.

FIG. 4 shows a discharge device where the discharge tube is a separate unit inserted into the output circuit. The discharge tube has two anodes 41 which are cylindrical and mounted on the ends of an insulating tube so that their axes coincide; the device also has two cathodes 10 placed symmetrically along the coinciding axes and close to the cylindrical anodes in such a way that the latter are situated between the cathodes. The output circuit consists of a waveguide 12 and the discharge tube passes through the waveguide in such a way that the longitudinal direction of the waveguide is perpendicular to the coinciding axes of the anodes and cathodes. The vacuum-tight insulating tube 43 joining the anodes 41 is permeable for waves generated in the discharge tube.

Below it will be shown that a cylindrical or rectangular coaxial line can serve as output circuit. The device shown in FIG. 4 can be modified in such a way that the output circuit is a rectangular coaxial line, cf. FIG. 11, having holes for the discharge tube through both the inner and the outer conductors. In this case, the field configurations are more favorable with a rectangular than with a circular coaxial line.

The device shown in FIG. 5 has a discharge tube roughly similar to the one in FIG. 1, but here the output circuit consists of a rectangular coaxial line 50–52, where holes for the discharge have been cut through the rectangular inner conductor 50 and through the two walls of the outer conductor that are parallel with the inner conductor; the centers of these holes lie on the axis of the anode cylinder 11. A movable double piston 18 makes it possible to tune the device. The design of the coaxial line is evident from FIG. 6.

FIG. 7 shows, from above, the inner conductor of the coaxial line and the hole for the discharge. In the device shown in FIGS. 5–6 the hole is meant to be circular, but in certain cases it may be favorable to use an oval slot, as in FIG. 8 showing a modified design of the inner conductor marked 80. An oval slot 81 through the inner conductor and through corresponding parts of the outer conductor implies a similar cross section for the cathodes of the discharge tube.

The device shown in FIG. 9 comprises a discharge chamber with one anode 91 and two cathodes 90. The anode, with a hole 910, is a portion of the plane inner conductor 91 of a rectangular coaxial line 90–91. The cathodes are two opposite portions of those walls 90 of the outer conductor that are parallel to the plane of the inner conductor; see also FIG. 10, which shows a section along C—C in FIG. 9. The output circuit is the continuation of the coaxial line 90–91, cf. of the white arrow.

The black and the white arrows in the figures hitherto referred to indicate that the noise energy is extracted in a direction perpendicular to the direction of the static magnetic field.

It is also possible to extract the noise energy in a direction that coincides with or its directly opposite to the direction of the static magnetic field, as will be seen from some of the subsequent figures.

In the device shown in FIG. 12, the anode 121 is a portion of the outer conductor of a circular coaxial line 10–121, and the cathodes are parts of the inner conductor of the coaxial line. The coaxial shape is evident from FIG. 13 which shows a section along line D—D of FIG. 12.

In the device shown in FIG. 14, the anode 141 is a portion of the inner conductor of a coaxial line 140–141, and the cathodes 140 are parts of the outer conductor of the coaxial line. The discharge takes place inside a vacuum-tight envelope 142 and between the anode 141 and the ends of the two cathodes 140, which are separated by a certain distance. The direction of the static magnetic field coincides with the longitudinal direction of the waveguide.

The device shown in FIG. 15 also comprises a circular coaxial line, but here there are two anodes 151 in the form of hollow portions of the inner conductor of the coaxial line and two cathodes 10, each placed inside a hollow portion and at some distance from the open end of that portion. The output circuit is the coaxial line whose outer conductor is marked 152.

Figure 16:
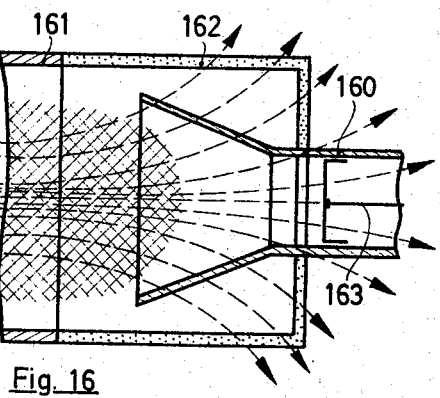
FIG. 16 shows a device with two cathodes; each of these consists of a rectangular waveguide widening towards the anode in the shape of a truncated pyramid.
Figure 17:
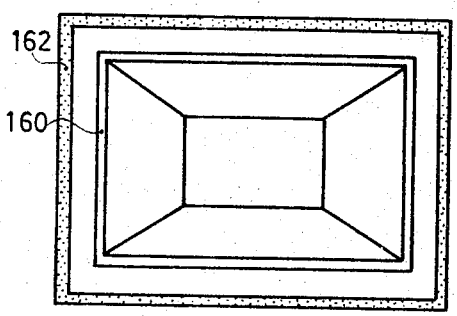
FIG. 17 shows a section along E—E in FIG. 16.

In all the discharge devices shown above the static magnetic field has been almost unidirectional. However, this is not always necessary. FIGS. 16–17 show a discharge device, where the direction of the magnetic field in the centre of the chamber coincides with the direction of the output waveguides 160, but where the magnetic field near the walls of the waveguides has a nonnegligible field component in a direction perpendicular to the longitudinal direction of the waveguides. In this device the anode is a cylinder 161, at the ends of which the two cathodes 160 are situated in symmetrical positions; each of the cathodes is an open rectangular waveguide gradually widening towards the anode 161 in the form of a truncated pyramid. The output circuit consists of one of these rectangular waveguides, the one on the left-hand side in the drawing. FIG. 17 shows the pyramid shape of the cathode seen from a section along E—E in FIG. 16.

Figure 18:
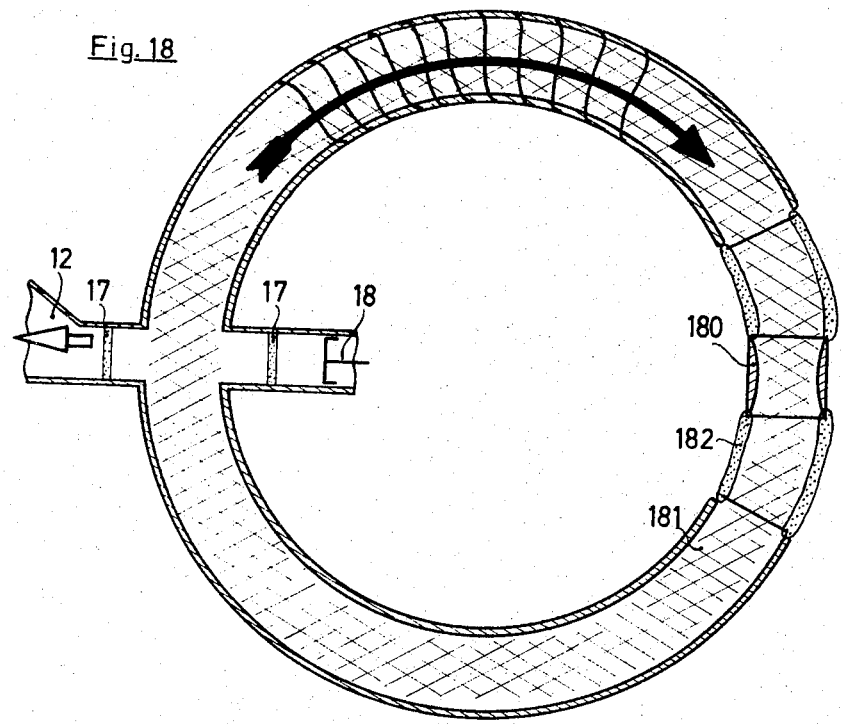
FIG. 18 shows a device comprising one cathode and one anode.
Figure 19:
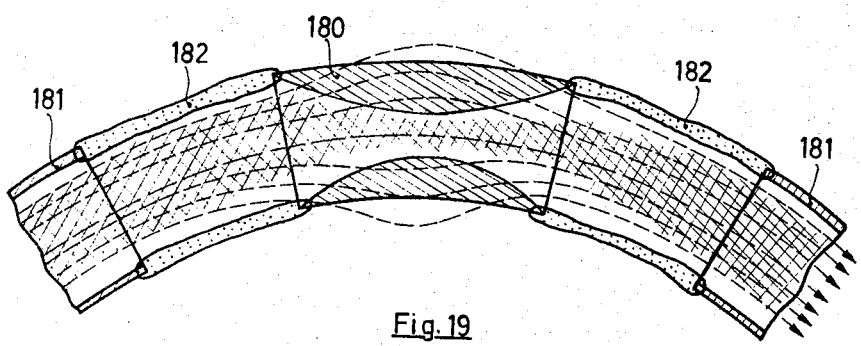
FIG. 19 shows the field configuration in a part of the device shown in FIG. 18.

The discharge device shown in FIGS. 18–19 also has an inhomogeneous static magnetic field. The device comprises one anode and one cathode; the anode 181 constitutes the greater part of a toroidal tube; the cathode 180 is situated between the two ends of the anode and it is mounted on and separated from the anode by vacuum-tight insulating portions 182 of the torus. Further, the cathode is a ring-shaped structure, whose axis on the whole coincides with the central axis of the toroidal tube. The inside surface of the cathode structure is convex. The output circuit consists of a waveguide 12, or alternatively a rectangular coaxial line, extending radially from the tube 181 approximately opposite to the cathode 180. As is shown in FIG. 19, the magnetic field is deformed at the position of the cathode 180; in this way the formation of the torus-shaped plasma column is facilitated. In the devices described above the electrons oscillate between the cathodes but in this device some electrons may pass through the hole in the cathode 180 and make one or more revolutions inside the toroidal tube 181.

Experiments have shown that it is possible to increase the noise power by means of a special design of the discharge chamber. Thus, devices of the kind now to be described are characterized by the introduction into the plasma region of some obstacle with narrow openings, through which the electrons have to pass.

The device shown in FIG. 20 differs from that shown in FIG. 1 only in the design of the discharge chamber. On both sides of the waveguide 12, the central portion of the cylinder 11—11 is thus almost solid but provided with several narrow openings or channels 121 for the passage of the electrons. It is evident from the figure that the cross-sectional area of these channels is considerably smaller than that of the whole discharge chamber. In this case, the channels 121 are positioned close to the central axis of the cylinder and it is preferable to employ cathodes 10 having unbroken surfaces.

This modification of the invention is, however, not limited to the design just described, having an almost solid central portion. Alternatively one can employ one or more disks having one or more openings or holes of suitable size and position. These disks are placed in the discharge chamber in such a way that the electrons can and must pass through the openings. FIG. 21 shows such a disk having one central opening. The diameter of the opening may be a few millimetres or less. It has been found, however, that the noise power level can be raised even further if the discharge chamber is designed in such a way that one obtains a discharge consisting of a great number of parallel beams. FIG. 22 shows a disk designed with this aim; it has several openings or holes evenly distributed over its whole surface. FIG. 23 shows another design, an annular disk with several holes evenly distributed over the whole surface of the annulus. In this case, the cathodes should be hollow, so that the cross section of the cathodes corresponds to the annular disk. However, it is not necessary to use a disk; alternatively one may employ a grid, either covering a whole circle as in FIG. 24 or covering an annulus as in FIG. 25.

The disks and grids just described may be included as improvements in all the devices shown in FIGS. 1–19. When more than one disk or grid is employed, it is necessary to ensure that the openings in one correspond to those in the other(s), i.e., the same magnetic flux tubes shall pass through the openings in all the disks or grids.

FIG. 26 shows a discharge device with two grids 71 and 72 in the discharge chamber. Components having direct counterparts in FIG. 20 have been marked with the same numbers as in said FIG. 20 and the grids are marked 71 and 72. In the region between the grids a helix 73 has been inserted, one end 74 of which is connected to the output circuit of the device 12. The other end 75 is connected to shorting element 18. The helix 73 is a slow-wave structure to efficiently transfer the energy of the slow-wave plasma structure to the fast waves of the output circuit.

FIG. 27 shows a discharge device where the discharge chamber consists of a rectangular waveguide 11, inside which are mounted a number of plates; half of the plates, in this case seven, are mounted on one of the walls of the waveguide 111 and the other half are mounted on the opposite wall 112. The plates have openings over an annular area and the cathodes 10 are hollow with a wall thickness about equal to the width of the annulus. The plates provide a slow-wave structure like in the embodiment of FIG. 26.

To sum up, it may be stated that the noise power increases substantially when the diameter of the discharge column is decreased to a few millimeters or less; also, the noise level is raised further if a great number of parallel, small-diameter discharge beams are generated by means of an anode that is itself—or is equipped with—a grid or plate with a great number of holes. It has been mentioned above that one may employ two or more plates or grids. The use of two grids gives a symmetric structure, which implies good opportunities for reducing the unwanted heating of certain coupling components for the output circuit. However, the use of two plates or grids necessitates an accurate alignment of corresponding holes; this difficulty does not arise for a device with only one grid or plate. The design and positioning of the holes should be such as to maximize the efficiency of converting input D.C. power to output noise power; many variations are possible and the drawings illustrate but a few examples. Experiments have shown that, in a discharge consisting of a "bundle" of parallel plasma beams, the outer beams will partially screen the electromagnetic fields surrounding the inner beams. Thus, the inner beams interact less efficiently with the output device, which is outside the bundle, and they contribute less noise power than the outer beams. This is the background for the design of the annular components shown above.

The discharge devices shown in FIGS. 26 and 27 have the advantage that the coupling structures are such that they permit the propagation of the same kind of slow waves as the plasma column and that their region of interaction with the plasma extends over a considerable part of the discharge column. This means that the fields of the waves in the plasma can be transmitted with small losses to the output circuit 12, where they are then converted into fast waves.

What we claim is:
1. A discharge device for generating strong noise signals having an upper noise frequency $f_s$ comprising a discharge chamber, an ionizable gas in said discharge chamber, said gas having an internal gas pressure of at least $10^{-4}$ mm. Hg and at most $10^{-2}$ mm. Hg, one anode electrode and at least one cathode electrode in said discharge chamber, said anode electrode being displaced from said cathode electrode, means connected to said anode electrode and said cathode electrode for establishing an electric field in the discharge volume between said anode electrode and said cathode electrode whereby a plasma of gas molecules, ions and electrons is created in said discharge volume, said plasma having a plasma frequency $f_p$, means for generating a static magnetic field in said discharge chamber, said magnetic field having a component substantially parallel to the direction from one of said electrodes to the other of said electrodes whereby electrons in said plasma move in spiral paths along the field lines of said magnetic field with a cyclotron frequency $f_c$ and collide with gas molecules, and an output circuit operatively adjacent to the region of the plasma for radiatively receiving the dynamic electromagnetic fields of noise energy generated in said plasma, the strength of said magnetic field and the density of said plasma being such that $f_c > f_s$ and $f_p > f_s$.

2. The discharge device of claim 1 comprising two cathode electrodes and one anode electrode, said cathode electrodes being spaced from each other and said anode electrode being between said cathodes and spaced from each cathode electrode, and said output circuit being in proximity to said anode electrode.

3. The discharge device of claim 1 comprising two cathode electrodes and one anode electrode, said anode electrode being a cylinder of conductive material about said discharge region, and said cathode electrodes being symmetrically placed at opposite ends of said cylinder and on the axis thereof, said output circuit being in the region of said cylinder.

4. The discharge device of claim 1 wherein said cathode electrode is a cold cathode.

5. A discharge device according to claim 1, comprising two cathodes and one anode, wherein the output circuit comprises a coaxial line whose longitudinal direction coincides with the longitudinal direction of the cathodes.

6. A discharge device according to claim 5 wherein the anode forms a portion of an outer conductor of the coaxial line, which is of the circular type, and the cathodes form parts of the inner conductor of the coaxial line.

7. A discharge device according to claim 1, comprising two cathodes and one anode, wherein the output circuit comprises an electromagnetic energy conduit means whose longitudinal direction coincides with the longitudinal direction of the cathodes.

8. A discharge device according to claim 1, comprising two cathodes and two anodes, wherein the anodes are cylindrical and mounted on the ends of an insulating tube so that their axes coincide, the cathodes being placed along said coinciding axes close to the cylindrical anodes in such a way that the latter are situated between the cathodes. and wherein the output circuit comprises electromagnetic energy conduit means perpendicular to said coinciding cylinder axes.

9. A discharge device according to claim 1, further comprising an obstacle in the discharge region, said obstacle having at least one opening through which the electrons must pass.

10. A discharge device according to claim 9, where said obstacle is a plate mounted in the discharge chamber with at least one opening through said plate.

11. A discharge device according to claim 10, wherein several openings are evenly distributed over the surface of the plate.

12. A discharge device according to claim 9, wherein at least one grid is mounted in the discharge chamber.

13. A discharge device according to claim 12, wherein the grid is annular.

14. A discharge device according to claim 9, wherein said obstacle comprises at least two plates in the discharge chamber, said plates each being provided with at least one opening.

15. A discharge device according to claim 9, wherein said obstacle is an output means situated in the discharge region of the discharge chamber, said output means being designed to propagate the same kind of slow waves as are propagated by the plasma and extending over a substantial part of the whole length of the discharge region.

16. A discharge device according to claim 15, wherein the output means comprises a helix that has one of its ends connected to the output circuit.

17. A discharge device according to claim 1, wherein the output circuit comprises a coaxial line having an inner conductor and an outer conductor.

18. A discharge device according to claim 17 wherein the anode is a portion of one of said conductors and the cathode is a portion of the other of said conductors of said coaxial line.

References Cited
UNITED STATES PATENTS

| | | | |
|---|---|---|---|
| 2,624,867 | 1/1953 | Cobine et al. | 331—78 |
| 2,658,149 | 11/1953 | Gallagher et al. | 331—78 |
| 2,706,782 | 4/1955 | Mumford | 331—78 |
| 2,872,581 | 2/1959 | Page et al. | 331—78 |
| 3,231,830 | 1/1966 | Knauer | 331—78 |

ROY LAKE, *Primary Examiner.*

S. H. GRIMM, *Assistant Examiner.*